United States Patent
Matuschek

(10) Patent No.: US 12,446,935 B2
(45) Date of Patent: Oct. 21, 2025

(54) PLATE FOR INSERTION INTO THE PALATE AND A METHOD FOR ITS PRODUCTION

(71) Applicant: Carsten Matuschek, Falkensee (DE)

(72) Inventor: Carsten Matuschek, Falkensee (DE)

( * ) Notice: Subject to any disclaimer, the term of this patent is extended or adjusted under 35 U.S.C. 154(b) by 614 days.

(21) Appl. No.: 17/757,270

(22) PCT Filed: Dec. 9, 2020

(86) PCT No.: PCT/EP2020/085328
§ 371 (c)(1),
(2) Date: Jun. 13, 2022

(87) PCT Pub. No.: WO2021/116195
PCT Pub. Date: Jun. 17, 2021

(65) Prior Publication Data
US 2023/0000533 A1     Jan. 5, 2023

(30) Foreign Application Priority Data
Dec. 13, 2019   (EP) .................................. 19216014

(51) Int. Cl.
  *A61B 17/80*   (2006.01)
  *A61C 7/10*    (2006.01)
  *A61B 17/68*   (2006.01)

(52) U.S. Cl.
  CPC ...... *A61B 17/8061* (2013.01); *A61B 17/8071* (2013.01); *A61C 7/10* (2013.01); *A61B 2017/681* (2013.01)

(58) Field of Classification Search
  CPC . A61B 17/80; A61B 17/8061; A61B 17/8071; A61B 17/809; A61C 7/10
  See application file for complete search history.

(56) References Cited

FOREIGN PATENT DOCUMENTS

WO    WO-2009111310 A2    9/2009

OTHER PUBLICATIONS

"International Application Serial No. PCT/EP2020/085328, International Search Report dated Feb. 10, 2021", w/ English Translation, (Feb. 10, 2021), 7 pgs.

"International Application Serial No. PCT/EP2020/085328, Written Opinion dated Feb. 10, 2021", (Feb. 10, 2021), 6 pgs.

Grayson, Barry H., et al., "Presurgical nasoalveolar moulding treatment in cleft lip and palate patients", Indian Journal of Plastic Surgery 42.S 01, (2009), pp. S56-S61.

Schiebl, Jonas, et al., "RapidNAM: algorithm for the semi-automated generation of nasoalveolar molding device designs for the presurgical treatment of bilateral cleft lip and palate", IEEE Transactions on Biomedical Engineering 67.5, (2019), pp. 1236-1271.

"Japanese Application No. 2022-535612, Office Action dated Dec. 19, 2024", w English Translation, (Dec. 19, 2024), 7 pgs.

(Continued)

*Primary Examiner* — Larry E Waggle, Jr.
(74) *Attorney, Agent, or Firm* — Schwegman Lundberg & Woessner, P.A.

(57) ABSTRACT

The invention relates to a plate (1) for insertion into the palate, the plate (1) having wings (4) on both sides of an imaginary center plane (9) running perpendicular to the plate (1), the wings being designed such that they bear against the palate at least in regions. The two webs (3) run on both sides of the central plane (9), so that a free space (6) running between the webs (3) is formed for receiving the vomer (13).

20 Claims, 6 Drawing Sheets

(56) References Cited

OTHER PUBLICATIONS

Figure 1:
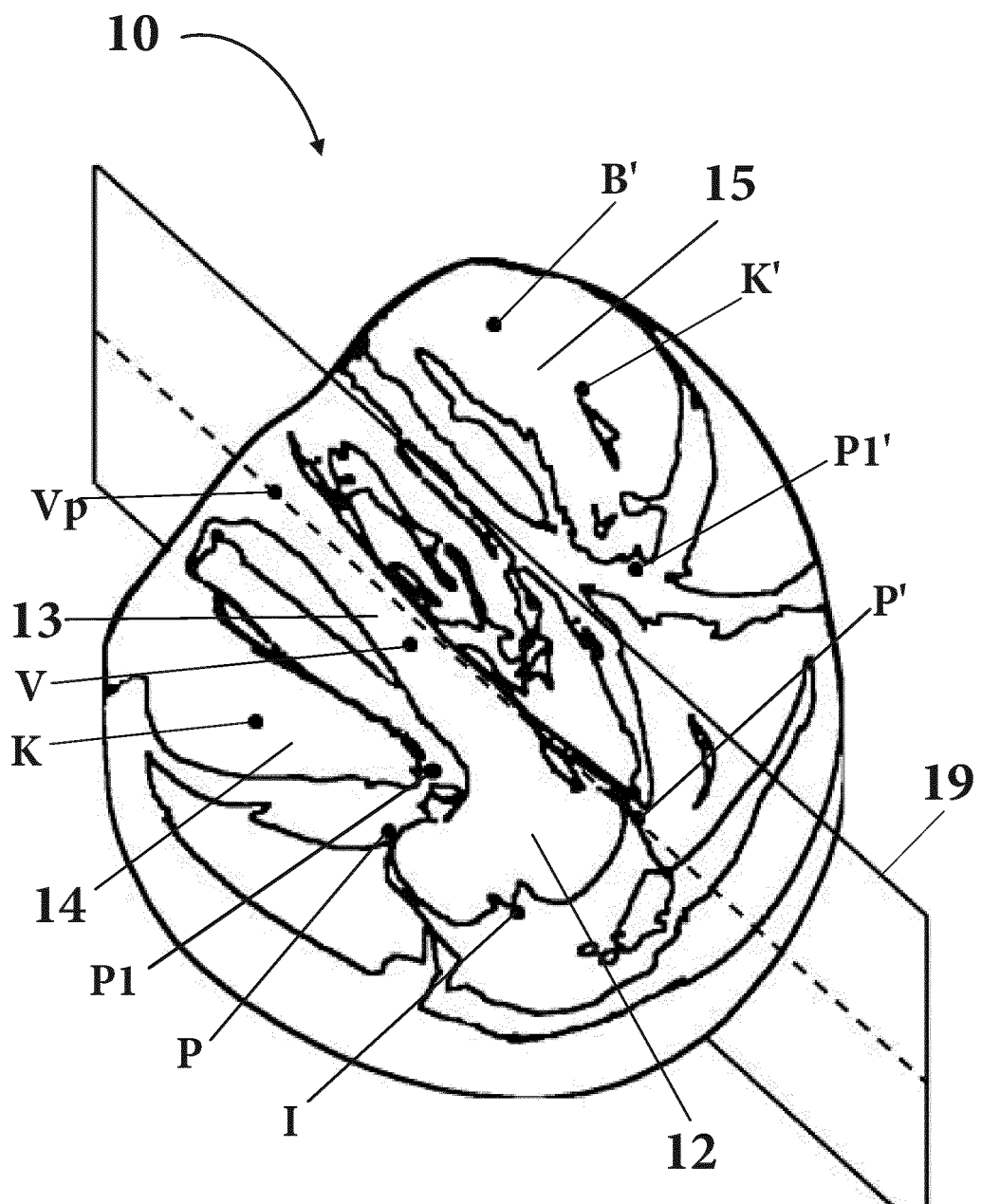

Fuchigami, Takao, et al., "Comparison of short-term effects of presurgical nasoalveolar molding and Hotz's plate on maxillary arch form in unilateral cleft lip and palate", Journal of Oral and Maxillofacial Surgery, Medicine, and Pathology 31.1, (2019), pp. 25-30.

"Japanese Application No. 2022-535612, Office Action dated Jun. 27, 2025", w English Translation, (Jun. 27, 2025), 4 pgs.

"Brazillian Application No. 11 2022 011463 0, Office Action dated Jun. 15, 2025", w English Translation, (Jun. 15, 2025), 8 pgs.

PLATE FOR INSERTION INTO THE PALATE AND A METHOD FOR ITS PRODUCTION

PRIORITY APPLICATIONS

This application is a U.S. National Stage Filing under 35 U.S.C. § 371 from International Application No. PCT/EP2020/085328, filed on Dec. 9, 2020, and published as WO2021/116195 on Jun. 17, 2021, which claims the benefit of priority to European Application No. 19216014.1, filed on Dec. 13, 2019; the benefit of priority of each of which is hereby claimed herein.

The subject matter of the present application is a plate for insertion into the palate having the features of the preamble of claim 1, a set of plates according to claim 12 and a method for producing a plate for insertion into the palate according to claim 14.

It is known that a cleft lip, jaw and palate is usually caused by an incorrectly developed or incorrectly positioned premaxilla. As is well known, the vomer in this case also occurs in a bent or twisted state. If such an abnormal development or position of a cleft lip, jaw and palate remains untreated, an obstruction of the nasal airways can occur, meaning that those affected can only breathe on one side or live with a significant respiratory deficit or have to undergo surgery to correct the nasal impairment.

A cleft lip, jaw and palate is usually present when there is a continuous cleft in the upper lip, maxilla, and palate. In this application, however, the term cleft lip, jaw and palate should also be used for forms of cleft in which, for example, only one or two of these structures are affected. Examples of this are cleft lip, cleft lip and jaw or cleft palate.

Devices and methods for treating the misalignments that occur in a cleft lip, jaw and palate are known in the prior art. These procedures aim to move or displace the position of the premaxilla of the infant and vomer in the first few days after birth of an infant with cleft lip, jaw and palate by using a palatal plate without surgery. Generally, such treatment with the palatal plate occurs in the first few days of the infant. That is because just a few days after birth, the maxilla of the infant begins to grow together and just a few weeks after birth, it is almost impossible to displace the premaxilla and vomer with a palatal plate.

The plate according to Hotz (T. Fuchigami et al., Comparison of short-term effects of presurgical nasoalveolar molding and Hotz's plate on maxillary arch form in unilateral cleft lip and palate, Journal of Oral and Maxillofacial Surgery, Medicine, and Pathology, Volume 31, Issue 1, January 2019, pages 25-30) is known, for example, as such a removable palatal plate. This custom-made plate can be placed in the oral cavity of the infant during the first few days of life to control the growth of the maxillary segments. With the Hotz plate inserted, the mandible of the infant is taken out of the resting position, so that a therapeutic muscle imbalance is created. Growth stimuli or growth blockages can be stimulated in a targeted manner depending on the design of the plate.

Another known example from the prior art is the method of nasoalveolar molding (NAM) according to Grayson (Grayson B H, Shetye P R, Presurgical nasoalveolar moulding treatment in cleft lip and palate patients, Indian J Plast. Surg., October 2009, 42 Suppl., p. 56-p. 61). In this method, a removable palatal plate is custom-made based on an impression of the maxilla of the infant. Inserting the NAM palatal plate in the oral cavity of the infant reduces misalignments of the premaxilla through the application of force. In addition, the Grayson palatal plate has extraorally protruding supports, which, in addition to the correction of the premaxilla, also enable a correction of nasal cartilage deformities. This allows additional bending of the vomer. However, correcting or straightening the shape of the vomer is not possible when treated with a NAM palatal plate.

However, it has been shown that treatment with the known palatal plates can indeed reduce the misalignment of the premaxilla of an infant with a cleft lip, jaw and palate, however, a straightening of the vomer or an avoidance of the curvature of the vomer is not achieved, or at least not always to a sufficient extent.

It is therefore the object of the present invention to develop an orthodontic appliance for treating a cleft lip, jaw and palate that can improve the quality of life of the patient.

This object is achieved by a plate for insertion into the palate and by a method for producing a plate for insertion into the palate according to the independent claims and by a set of plates for sequentially straightening the vomer of an infant with cleft lip, jaw and palate. Specific embodiments are described in the description, in the subclaims and in the figures.

The plate proposed here for insertion into the palate has wings on both sides of an imaginary center plane running perpendicular to the plate, the wings being designed such that they bear against the palate at least in regions. The wings cause the plate to be insertable in a specific position in the palate of the infant. In addition, the wings of the proposed plate promote a tight fit of the plate in the palate of the infant when the plate is inserted into the palate.

Furthermore, the plate proposed here comprises at least two webs running at least in sections on both sides of the center plane, so that a free space running between the webs is formed for receiving the vomer.

The plate proposed here for insertion into the palate is based on the insight that straightening a curved vomer or avoiding a curvature of an uncurved vomer when treating a cleft lip, jaw and palate with a palate plate can prevent consequential damage, being able to significantly reduce the breathing difficulties of the patient in the nasal region.

The two webs of the proposed plate run at least in sections on both sides of the center plane such that they form a free space between them for receiving the vomer. When inserting the plate into the palate, the vomer is received into the free space and caught between the two webs. The shape of the plate is adapted to the palate of the infant such that the plate is supported on the palate in particular by the wings and is fixed to the palate in a plurality of directions. For example, the plurality of directions can comprise at least one direction along the center plane of the plate and at least one direction transverse to the center plane. The free space defines a displacement in the course of the vomer and is suitable for receiving a vomer. The center plane of the plate can correspond to the sagittal plane of the palate when the plate is inserted into the palate. Due to the firm fit of the plate on the palate and an offset of the course of the webs to the current course of the vomer, a new course can be imposed on the shape of the course of the vomer enclosed in the free space by means of a therapeutic force. The therapeutic force is considered to be the force exerted by the proposed plate on components of the palate of the infant, such as the vomer or premaxilla, or both, when the plate is inserted into the palate of the infant.

During treatment with the proposed plate, a change in the course of the vomer can be achieved by a therapeutic force in which the course of the webs of the plate deviate at least in sections from the course of the vomer when the plate is inserted into the palate of the infant and the webs displace the vomer at least in regions, that is, the therapeutic force. The course of the vomer can be displaced, for example, if the free space on a first side of the vomer transverse to the center plane is smaller than the free space on a side of the vomer opposite the first side transverse to the center plane. As a result, as the plate is inserted into the palate of the infant, the vomer is forced toward the side of the vomer having more free space, that is, displaced. In particular, a displacement of the course of the vomer can be provided, in which the free space is formed at least in sections only on the second side of the vomer transverse to the center plane. The webs can have a curvature adapted to the vomer. The curvature of the webs can be less pronounced compared to the curvature of the vomer, for example. Particular advantages result from the fact that the webs can reduce the curvature of the vomer through the therapeutic force. The direction of the therapeutic force can be selected through the shape and arrangement of the webs such that an individual misalignment of the vomer can be specifically reduced and additionally or alternatively corrected. As a result, a targeted change in the course of the vomer and a targeted straightening of a curved vomer are made possible by the proposed plate.

The webs of the proposed plate can be designed to run in a straight line along the center plane and additionally or alternatively to run next to one another along the center plane. Webs running next to one another in a straight line and additionally or alternatively along the center plane are particularly advantageous in exerting a therapeutic force on the vomer until the course of the vomer corresponds to the course of the free space running between the webs.

It can be provided that an initial state of the course of the vomer and additionally or alternatively a desired final state of the course of the vomer are defined and the course of the vomer is changed gradually by successive treatment with a plurality of proposed plates. The initial state of the course of the vomer can correspond to the initial course of the vomer of the infant with cleft lip, jaw and palate prior to treatment with the plurality of proposed plates. A free space of a first plate of the plurality of proposed plates defined by a course of the webs can cause a first displacement of the course of the vomer in the initial state when the first plate is inserted into the palate of the infant. The course of the webs of the first plate has a first offset with respect to the course of the vomer in the initial state. After the course of the webs of the first plate has been forced onto the course of the vomer, the first plate of the plurality of proposed plates can be replaced with a second plate of the plurality of proposed plates. The second plate of the plurality of proposed plates can cause a second displacement of the course of the vomer when the second plate is inserted into the palate of the infant through a free space defined by a course of the webs of the second plate. The course of the webs of the second plate has a second offset with respect to the course of the vomer in the initial state, the second offset being greater than the first offset. The second plate can also be replaced by further plate with a further displacement in the course of the vomer. The plates can be successively exchanged until the last plate of the plurality of proposed plates is inserted, the last plate of the plurality of proposed plates having a course of the webs which corresponds to the desired end state of the course of the vomer, so that the course of the desired final state can be imposed on the vomer by means of the last plate. By gradually changing the course of the vomer per plate, smaller displacements of the vomer can be made and thus pain for the infant can be reduced by the treatment using a respective plate. In addition, the potential displacement of the course of the vomer by only one plate is limited to a maximum displacement. Successive treatment with a plurality of plates can overcome the maximum displacement of a single plate and achieve a greater total displacement.

In addition, the course of the vomer can be maintained by a course of the webs adapted to the course of the vomer. This is useful, for example, if the course of the vomer is already in the desired shape and should be kept in this shape.

The wings of the proposed plate running on both sides of the imaginary center plane perpendicular to the plate, which are configured such that they bear at least in regions against the palate, can be designed in particular to fix the plate in the palate of the infant. Due to their shape, the wings with their upper sides can conform to the palate of the infant, at least in regions.

Preferably, the wings can be designed such that upon insertion of the plate into the palate, they each contact a lateral maxillary segment of the infant. That is, the upper sides of the wings can be configured to contact maxillary, that is, cranial, with the mandibular, that is, caudally, directed surfaces of the lateral maxillary segments. Furthermore, the upper sides of the wings and additionally or alternatively the shape of the wings can be designed to fit, preferably with a precise fit, to the surface of the maxillary segments. This has the advantage that the hold of the plate on the maxilla of the infant can be supported when inserting the plate and that the appropriate shape of the wings improves the wearing comfort of the infant.

Typically, the plate can be made in one piece and additionally or alternatively consist of plastic. Examples are polyetheretherketone (PEEK) and/or synthetic resin.

In one embodiment, the plate can have a receptacle for receiving the premaxilla, the receptacle comprising at least one trough-like depression. The receptacle can preferably serve to receive the premaxilla of the infant and reduce misalignment of the premaxilla of the infant. The trough-like depression is designed such that the premaxilla of the infant is arranged in the trough-like depression when the plate is inserted into the palate of the infant.

It can be provided that the shape and arrangement of the trough-like depression is selected such that the trough-like depression has an offset with respect to the center plane of the plate, so that a therapeutic force can be exerted on the premaxilla of the infant through the trough-like depression when the plate is inserted into the palate of the infant. The shape and arrangement of the trough-like depression can be selected such that an individual misalignment of the premaxilla can be reduced in a targeted manner and additionally or alternatively corrected by the therapeutic force.

The trough-like depression can be so pronounced that the shape and arrangement of the trough-like depression corresponds to the shape and arrangement of the premaxilla. This is useful, for example, if the current shape and arrangement of the premaxilla already corresponds to the desired shape and arrangement and should be kept in said shape and arrangement.

Depending on the shape and arrangement of the trough-like depression and the course of the webs, various misalignments of the vomer and premaxilla can be treated in a targeted manner by means of the proposed plate. A proposed plate having, for example, an offset of the trough-like depression to the center plane of the plate and an offset of the course of the webs to the center plane of the plate can simultaneously change the course of the vomer and the arrangement of the premaxilla when the plate is inserted into the palate of the infant. Provision can also be made for the proposed plate to only have an offset in the course of the webs with respect to the center plane, as a result of which only a displacement in the course of the vomer is brought about. In this case, the trough-like depression can be arranged without offset to the center plane or can correspond to the shape and arrangement of the premaxilla. This can prevent displacement of the premaxilla by the trough-like depression while allowing displacement of the course of the vomer when the plate is inserted into the palate of the infant. In an analogous manner, the plate can have a course of the webs without offset to the center plane or a course of the webs corresponding to the course of the vomer, and an offset of the trough-like depression to the center plane of the plate. It is thus possible to maintain the course of the vomer and change the shape and arrangement of the premaxilla. This makes it possible to treat a plurality of misalignments in the maxilla of the infant by means of the proposed plate.

In addition, the receptacle can be arranged on an end of one of the webs or both webs running in a direction along the center plane. One of the two webs can be rounded off at said end. Preferably, the end of this web can be designed such that it is adapted to the respective anatomical condition of the palate, such as the nasal concha. However, both webs can also be rounded off at said ends. Both webs can preferably be designed at these ends such that the respective end is adapted to the respective anatomical condition of the palate, such as the nasal concha. The ends of the webs running in the direction along the center plane can merge directly into the receptacle or have a spacing from the receptacle. The transition between the ends of the webs running along the center plane and the receptacle can preferably be designed such that the transition is adapted to the respective anatomical condition of the palate, such as the nasal concha, for example. Such adaptations to the web or the transition of the webs to the receptacle can improve the fit of the plate to the palate of the infant and reduce pain in the infant when the plate is inserted into the palate of the infant.

The trough-like depression can be formed such that an inner surface of the trough-like depression circumferentially surrounds the premaxilla when the plate is inserted into the palate. Typically, the end of one of the webs running along the center plane can point forward in the direction of the body, that is, in anterior, when the plate is inserted into the palate. Such an arrangement of the receptacle in the plate offers the advantage that the receptacle and thus the trough-like depression can be arranged at the level of the premaxilla when the plate is inserted into the palate. Furthermore, circumferentially surrounding the premaxilla by the trough-like depression enables the premaxilla to be held in a particularly advantageous manner when the plate is inserted into the palate of the infant. In addition, the premaxilla can be prevented from slipping out of the trough-like depression.

In addition, it can be provided that a maximum width, determined transversely to the center plane, of a receiving region of the plate containing the receptacle is at most 80 percent, preferably at most 70 percent, particularly preferably at most 60 percent of a maximum width of the plate determined transversely to the center plane. The maximum width of the plate can be, for example, at most 8 cm, preferably at most 6 cm, particularly preferably at most 5 cm. A reduced width of the plate in the region of the receiving region is advantageous in that the position of the premaxilla can be changed by the plate independently of the front regions of the lateral jaw segments when the plate is inserted into the palate. However, it can also be provided that the plates are designed such that the lateral segments can be moved independently of the premaxilla when the plate is inserted into the palate. For example, displacements of the lateral segments can be simulated independently of the vomer by means of a digital or analog model operation. In the model operation, the lateral segments can be relocated individually, in particular such that the position of the lateral segments relative to one another can be adjusted for optimal insertion of the premaxilla. By individually adjusting the lateral segments, misalignments in the palate of the infant can be corrected or at least reduced better and, above all, in a more targeted manner.

In a further embodiment, the wings can have a contact surface of the plate with the palate. The webs can protrude on one side of the plate so that they are raised above the contact surface. The contact surface can typically extend across the upper side of the wings. The webs can preferably protrude cranially from the contact surface. The webs can, for example, protrude cranially in a step-like manner from the contact surface. The contact surface can prevent the webs from extending too far cranially into the nasal region of the infant. This is because webs that extend too far cranially can block the nasal airways of the infant and pose a serious risk of death for the infant through suffocation.

In a further embodiment, a height of the webs, determined perpendicularly to the contact surface and starting from the contact surface, can be at least 0.4 cm, preferably at least 0.8 cm, particularly preferably at least 1.2 cm and additionally or alternatively at most 2 cm, preferably at most 1.8 cm, particularly preferably at most 1.5 cm. Alternatively, the height of the webs along the center plane can change by at most 50 percent, preferably by at most 30 percent, particularly preferably by at most 10 percent of a minimum or a maximum height of the webs. A maximum height of a first web can deviate, for example, by at most 50 percent, preferably by at most 30 percent, particularly preferably by at most 10 percent, from a maximum height of a second web. Alternatively or additionally, the height of the webs can be at least three times, preferably at least twice, particularly preferably at least once, a minimum width of the webs determined transversely to the center plane. Webs that are too low can, for example, mean that the vomer cannot be supported laterally to a sufficient extent, so that a curvature or, respectively, a straightening of the vomer cannot be prevented or, respectively, cannot take place. Webs that do not exceed a maximum height can avoid obstruction of the nasal airway and serious hazard to the infant from suffocation when the plate is inserted into the palate.

In a further embodiment, the webs can be spaced apart from one another transversely to the center plane, wherein a minimum spacing of the webs from one another can be at least 0.3 cm, preferably at least 0.5 cm, particularly preferably at least 0.7 cm and/or at most 2 cm, preferably at most 1.5 cm, particularly preferably at most 1 cm. Alternatively, the spacing of the webs from one another along the center plane can change by less than twice, preferably by less than once, particularly preferably by less than half the minimum spacing of the webs. Typically, a minimum spacing of the webs from one another can be provided to allow the vomer to fit in the free space running between the webs when the plate is inserted into the palate.

Alternatively, the webs can each have a specific length along the center plane and a specific width transverse to the center plane, wherein the length of each web can be at least twice, preferably at least three times, particularly preferably at least four times its width. Furthermore, it can be provided that the width of each web changes by less than twice, preferably by less than once, particularly preferably by less than half the minimum width of the webs.

In a further embodiment, the wings can be arranged on sides of the webs facing away from the center plane. For example, the wings can be designed such that they reach up to the webs. Wings that reach up to the webs offer the advantage, for example, for the plate to have a high degree of stability. This allows the plate to withstand forces applied when the plate is inserted without breaking.

Alternatively, a maximum length of the wings determined along the center plane can be at most 100 percent, preferably at most 90 percent, particularly preferably at most 80 percent of a length of one of the webs or alternatively all webs determined along the center plane. By limiting the length of the wings, the lateral jaw segments can be left out of the plate at least in regions. This allows the premaxilla to be displaced independently of the lateral jaw segments or the lateral jaw segments to be displaced independently of the premaxilla through use of the plate.

The maximum length of the wings can define a longitudinal section aligned along the center plane. In the longitudinal section, a maximum width of the plate determined transversely to the center plane can be reduced by at least 40 percent, preferably by at least 50 percent, particularly preferably by at least 60 percent, wherein a length of the longitudinal section determined along the center plane can be at most 25 percent, preferably at most 15 percent, particularly preferably at most ten percent of a maximum length of the plate determined along the center plane.

In a further embodiment, the plate can comprise a holding device for clamping a tensioning device for applying force to the plate along the center plane, wherein the holding device can be arranged on an end of the receptacle facing away from the webs and running in a direction along the center plane. For example, the holding device can protrude anteriorly from the receptacle when the plate is inserted into the palate. The tensioning device can be coupled to the plate at the holding device. A force can be transmitted to the plate via the holding device via a tensile stress of the tensioning device. Typically, the tensile stress or force transfer can be applied posteriorly when the plate is inserted into the palate. However, the effects of force can also be provided in anterior. In addition, however, a myofunctional force exerted by the tongue of the infant on the plate can also be taken into account and utilized when the plate is placed in the palate of the infant. Examples of a tensioning device can be rubber bands or springs. For example, the force can be transmitted as a therapeutic force to the vomer and additionally or alternatively to the premaxilla. This allows the vomer and additionally or alternatively the premaxilla to be displaced along the center plane through use of the plate. In this way, any misalignments of the premaxilla and the vomer that occur can be corrected and rectified in anterior or in posterior. The corrective effect of the inserted plate can be promoted here by the myofunctional force exerted by the tongue of the infant on the plate. In addition, therapeutic force can be applied to one or both of the lateral jaw segments to correct the position of the lateral jaw segment(s).

The holding device can have, for example, two fixing projections which protrude anteriorly when the plate is inserted into the palate. The fixing projections can be arranged on both sides of the center plane, for example. The arrangement of the fixation projections can affect the direction of the therapeutic force transverse to the center plane. This enables further adjustability of the therapeutic force, which means, for example, that the lateral jaw segments can be shifted more individually when the plate is inserted into the palate.

A set of plates for sequentially straightening the vomer of an infant with cleft lip, jaw and palate is further proposed.

The set of plates can help treat misalignments of the vomer successively. The courses of the webs of the plates of the set of plates can have different offsets with respect to a course of the webs of a first plate of the set of plates. The respective offset of the course of the webs with respect to the course of the webs of the first plate can increase with each further plate, so that a therapeutic force of each subsequent plate gradually changes the course of the vomer.

The set of plates comprises at least a first plate described above and a second plate described above, a first spatial course of the webs of the first plate in a direction along the center plane of the first plate differing from a second course of the webs of the second plate in a direction along the center plane of the second plate. Different courses of the webs of the plates of the set of plates can bring about different therapeutic forces when the respective plate is inserted into the palate. This allows the vomer to be sequentially straightened by using the first plate and then replacing the first plate with the second plate. It can be seen that further plates for the sequential straightening of the vomer with different courses of the webs of the respective plate can be provided to reduce a misalignment of the vomer. With the sequential use of a set of plates having a plurality of plates, it can be provided that a spacing between the webs and thus the free space for receiving the vomer of the respective plate increases with each subsequent plate. This offers the advantage that the increasing volume of the vomer of the infant as the infant grows can be taken into account with each successive plate of the set of plates. In addition, misalignments of the premaxilla and the lateral jaw segments can also be corrected or at least reduced by the set of plates.

Alternatively, the webs of the first plate can comprise a first and a second web. The webs of the second plate can comprise a first web and a second web. Each of the webs can have a first end running in a direction along the center plane and a second end opposite the first end. The first end of the first web of the first plate can be arranged offset by a first transverse offset transverse to the center plane of the first plate with respect to the second end of the first web of the first plate. The first end of the second web of the first plate can be arranged offset by a second transverse offset transverse to the center plane of the first plate with respect to the second end of the second web of the first plate. The first end of the first web of the second plate can be arranged offset by a third transverse offset transverse to the center plane of the second plate with respect to the second end of the first web of the second plate. The first end of the second web of the second plate can be arranged offset by a fourth transverse offset transverse to the center plane of the second plate with respect to the second end of the second web of the second plate. The first transverse offset can be at least 30 percent, preferably at least ten percent, particularly preferably at least five percent smaller than the third transverse offset. Additionally or alternatively, the second transverse offset can be at least 20 percent, preferably at least ten percent, particularly preferably at least five percent smaller than the fourth transverse offset. Additionally or alternatively, the first end of the first web of the first plate can be arranged offset by a first longitudinal offset along a direction parallel to the center plane of the first plate with respect to the second end of the first web of the first plate. The first end of the second web of the first plate can be arranged offset by a second longitudinal offset along a direction parallel to the center plane of the first plate with respect to the second end of the second web of the first plate. The first end of the first web of the second plate can be arranged offset by a third longitudinal offset along a direction parallel to the center plane of the second plate with respect to the second end of the first web of the second plate. The first end of the second web of the second plate can be arranged offset by a fourth longitudinal offset along a direction parallel to the center plane of the second plate with respect to the second end of the second web of the second plate. The first longitudinal offset can be at least 15 percent, preferably at least ten percent, particularly preferably at least five percent smaller than the third longitudinal offset. Additionally or alternatively, the second longitudinal offset can be at least 15 percent, preferably at least ten percent, particularly preferably at least five percent smaller than the fourth longitudinal offset.

The longitudinal offset or the transverse offset enables a targeted reduction of the misalignment of the premaxilla. Typically, this makes it possible to displace the premaxilla along the center plane and additionally or alternatively along the plane orthogonal to the center plane. The targeted reduction per plate can usually be at most 0.3 cm, preferably at most 0.2 cm, particularly preferably at most 0.1 cm and additionally or alternatively at least 0.05 cm.

Further proposed is a method for producing a plate for insertion into the palate of an infant with a cleft lip, jaw and palate for straightening the vomer of the infant, comprising the steps of:
making and measuring an impression of the maxilla of the infant for determining a spatial arrangement of the vomer, the premaxilla and the two lateral maxillary segments of the infant relative to one another,
determining a transverse vomer misalignment of the end of the vomer directed toward the premaxilla, determined transversely to the sagittal plane of the infant, and additionally or alternatively
determining a vomer longitudinal misalignment of the end of the vomer directed toward the premaxilla, determined along the sagittal plane of the infant, and
producing a previously described plate,
the webs of the plate being designed as a first web and as a second web, each having a first end running in one direction along the center plane and a second end opposite the first end such that
(i) the first end of the first web is arranged offset by a first transverse offset determined transversely to the center plane of the plate with respect to the second end of the first web and that the first end of the second web is arranged offset by a second transverse offset determined to the center plane of the plate with respect to the second end of the second web,
the first transverse offset and the second transverse offset each being selected depending on the previously determined vomer transverse misalignment; and additionally or alternatively
(ii) the first end of the first web being arranged offset by a first longitudinal offset determined along a direction parallel to the center plane of the plate with respect to the second end of the first web and the first end of the second web being arranged offset by second longitudinal offset determined along a direction parallel to the center plane of the plate with respect to the second end of the second web,
the first longitudinal offset and the second longitudinal offset each being selected depending on the previously determined vomer longitudinal misalignment.

Typically, in the method of production, prior to production of the plate, an impression of the maxilla of the infant is first made. The impression can, for example, be taken digitally and additionally or alternatively analogously. The analog impression can preferably be digitized. The misalignment of the vomer, the premaxilla and the lateral jaw segments can be measured from the impression. Depending on the extent of the respective misalignment, a different number of plates can be planned and produced for reducing the respective misalignment.

In addition, the method can comprise the following steps:
producing a first plate according to the method described above and a second plate according to the method described above,
the first transverse offset of the first end of the first web of the first plate being able to be selected to be smaller than the first transverse offset of the first end of the first web of the second plate and the second transverse offset of the first end of the second web of the first plate being able to be selected to be smaller than the second transverse offset of the first end of the second web of the second plate and additionally or alternatively
the first longitudinal offset of the first end of the first web of the first plate being able to be selected to be smaller than the first longitudinal offset of the first end of the first web of the second plate and the second longitudinal offset of the first end of the second web of the first plate being able to be selected to be smaller than the second longitudinal offset of the first end of the second web of the second plate.

Figure 2A:
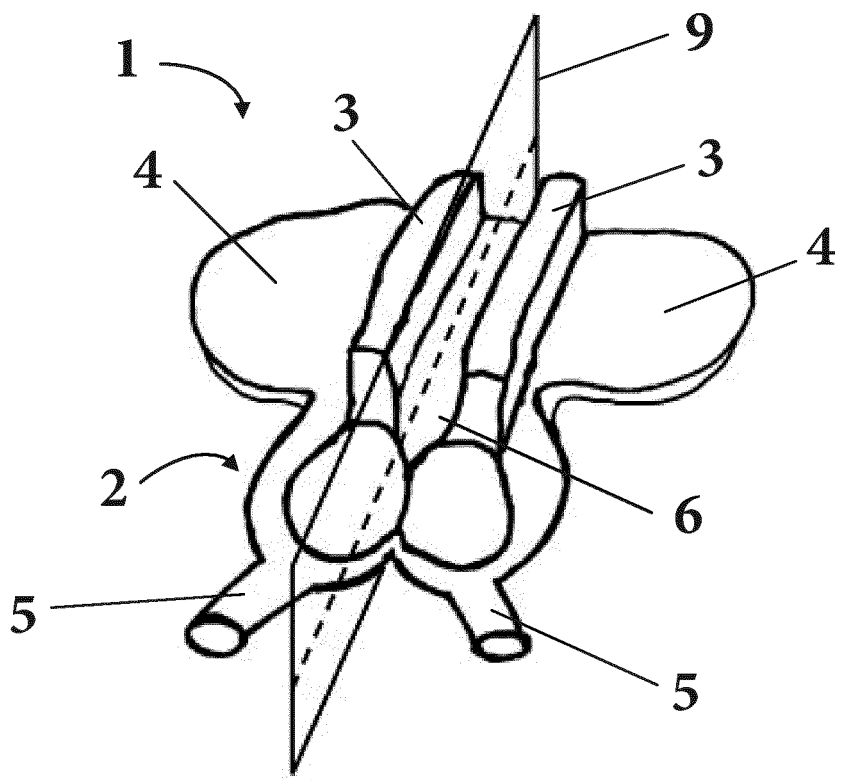
Figure 2B:
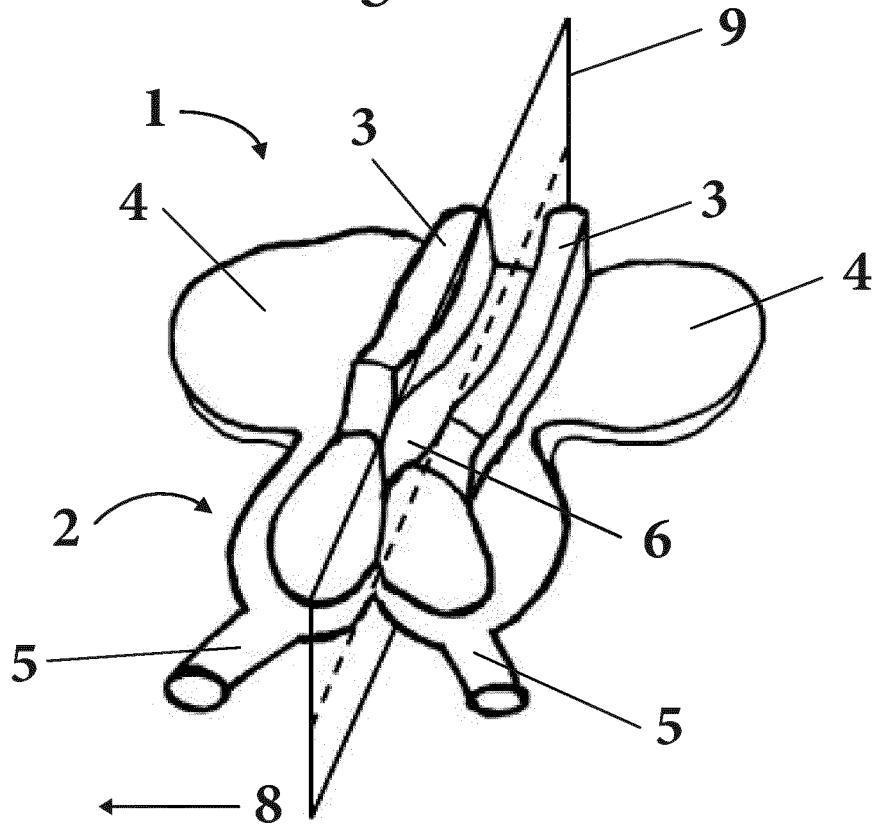
Figure 2C:
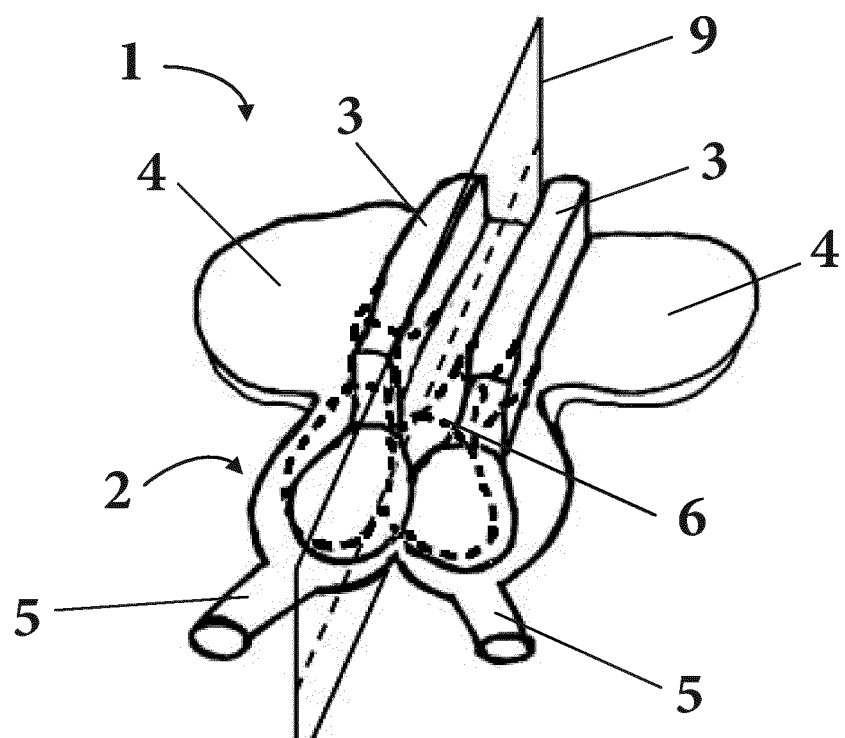
Figure 3A:
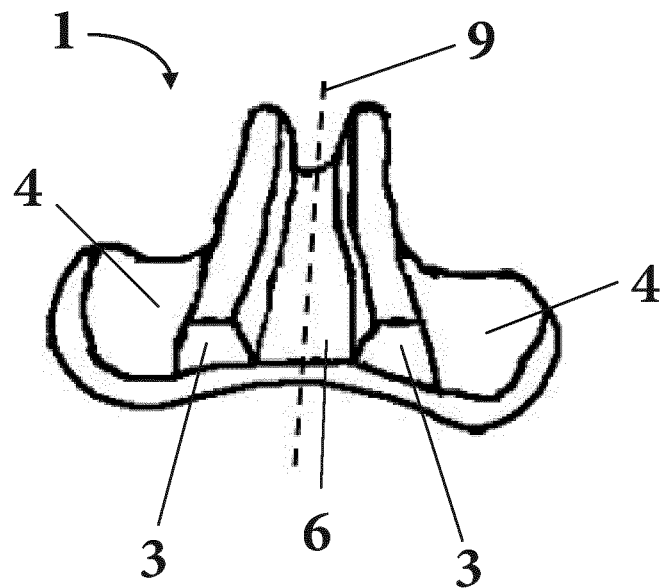
Figure 3B:
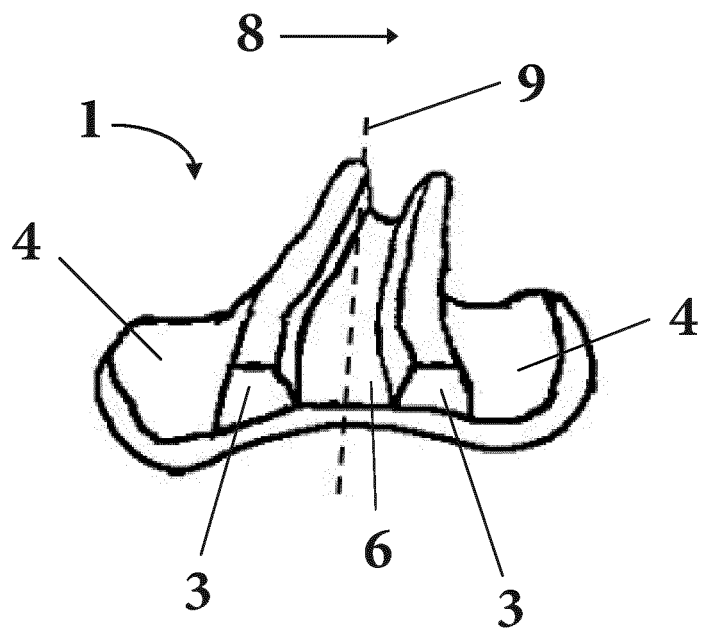

An embodiment of a set of plates of the type proposed here and of the method proposed here are shown in the figures and are explained in more detail on the basis of the following description. Shown are:

FIG. 1 an oblique view of an impression of the maxilla of an infant with a misalignment of the vomer and the premaxilla;

FIG. 2A a perspective illustration of an embodiment of a first plate of the proposed set of plates in front view;

FIG. 2B a perspective illustration of a second plate of the proposed set of plates in front view;

FIG. 2C a perspective illustration of the first plate with a superimposition of the second plate of the proposed set of plates in front view;

FIG. 3A a perspective illustration of the first plate of the proposed set of plates in rear view;

FIG. 3B a perspective illustration of the second plate of the proposed set of plates in rear view;

FIG. 4A-D schematic illustrations of arrangements of the receptacle and the two webs of a plate of the proposed set of plates in plan view; and FIG. 5A-D longitudinal cross-sections of a plate of the proposed set of plates with different transitions between the webs and the receptacle.

Referring to the figures, there is shown an embodiment of a set of plates for sequentially straightening the vomer of an infant with cleft lip, jaw and palate and for reducing misalignment of the premaxilla of the infant. By sequentially using the set of plates, the vomer of the infant can be straightened and the vomer of the infant can be prevented from being curved, and the misalignment of the premaxilla of the infant can be reduced.

FIG. 1 shows an oblique view of a digital impression 10 of a maxilla of an infant with a cleft lip, jaw and palate. The impression 10 has a circular outer contour and defines an impression center plane 19 along its diameter. The impression center plane 19 corresponds to the sagittal plane of the infant. Two raised lateral maxillary segments 14, 15, which are each formed in an opposite outer region of the impression 10, are depicted running along the impression center plane 19 on both sides. The vomer 13 of an infant is depicted between the maxillary segments 14, 15 as a web-like elevation. A first end of the vomer 13 depicted is arranged midway between the maxillary segments 14, 15. Starting from the first end, the vomer 13 extends along the impression center plane 19 at an angle of approximately 10 degrees to the impression center plane 19. The premaxilla of the infant 12 is depicted raised at a second end of the vomer 13 opposite the first end. The premaxilla 12 is connected to the second end of the vomer 13 and comprises two spherical formations. The spherical formations are arranged on a side of the premaxilla 12 facing away from the second end of the vomer 13. Furthermore, the premaxilla 12 extends in a direction at an angle of approximately 30 degrees to the impression center plane 19. The premaxilla 12 and the second end of the vomer 13 at least in regions surround a first 14 of the two lateral maxillary segments 14, 15 at a short spacing. Such a short spacing typically promotes rapid growing together of the premaxilla 12, the vomer 13 and the first maxillary segment 14. However, a large spacing from a second maxilla element 15 opposite the first maxilla element 14 resulting from this misalignment of the premaxilla 12 and the vomer 13 delays the growing together of the premaxilla 12, the vomer 13 and the second maxillary segment 15. Said misalignment usually results in a cleft lip, jaw and palate in the maxilla of the infant. Such a misalignment can be treated with the proposed set of plates.

The spatial arrangement and extent of the misalignment of the premaxilla 12, the vomer 13 and the lateral jaw segments 14, 15 can be measured by means of an impression 10 of the maxilla of an infant with a cleft lip, jaw and palate as shown in FIG. 1. The points shown in FIG. 1 can be used for the measurements. Said points describe a base point B', a posterior point Vp or a midpoint V of the vomer 13, a gingival sulcus point K or K' of the first or second maxillary element 14, 15, alveolar gap pole points P1 or P1', anterior points of the alveolar crest P and P' and an interincial point I of premaxilla 12. Subsequently, a vomer transverse misalignment determined transversely to the impression center plane 19 and a vomer longitudinal misalignment of the end of the vomer 13 directed towards the premaxilla 12, determined along the impression center plane 19 can be determined. Furthermore, a misalignment of the premaxilla 12 and the lateral jaw segments 14, 15 can be determined from the impression 10. The vomer transverse misalignment and/or the misalignment of the premaxilla 12 and the lateral jaw segments 14, 15 can be described and determined, for example, by the spacings of the various points illustrated in Table 1 transverse to the impression center plane 19. The first impression described in Tables 1 and 2 was taken from the palate of the infant. The remaining impressions are designed by model operations. However, it can also be provided that the individual impressions are each taken from the palate of the infant. The vomer longitudinal misalignment can be determined, for example, by the spacings listed in Table 2 from the base point B' to the posterior point Vp of the vomer 13 along the impression center plane 19. The corresponding spacings for seven digital impressions are shown as an example. The specified values are rounded to the decimal place. Depending on the extent of the particular misalignment, a number of plates of the type suggested can be planned and defined to produce a set of plates for sequentially straightening the premaxilla 12 and vomer 13 of the infant with cleft lip, jaw and palate and sequentially reducing the misalignment the premaxilla 12, the vomer 13 and the lateral jaw segments 14, 15 of the infant.

TABLE 1

Spacings of different points of the impressions transverse to the center plane of the impression

| | Spacing Vp – I transverse to the center plane in cm | Spacing V – K' transverse to the center plane in cm | Spacing V – K' transverse to the center plane in cm | Spacing P1 – P1' transverse to the center plane in cm | Spacing P – P' transverse to the center plane in cm |
|---|---|---|---|---|---|
| First impression | 1.4 | 0.9 | 2 | 1.9 | 0 |
| Second impression | 1 | 1.1 | 1.7 | 1.3 | 0.2 |
| Third impression | 0.4 | 1.3 | 1.5 | 1 | 0.6 |
| Fourth impression | 0.3 | 1.3 | 1.5 | 0.6 | 0.5 |
| Fifth impression | 0.3 | 1.3 | 1.5 | 0.5 | 0.3 |
| Sixth impression | 0.2 | 1.4 | 1.4 | 0.3 | 0.2 |
| Seventh impression | 0.3 | 1.4 | 1.4 | 0.2 | 0 |

TABLE 2

Spacings from the posterior point Vp to the base point B' along the impression center plane

| | Spacing B' – Vp along the center plane in cm |
|---|---|
| First impression | 0.5 |
| Second impression | 0.5 |
| Third impression | 0.5 |
| Fourth impression | 0.8 |
| Fifth impression | 1 |
| Sixth impression | 1.1 |
| Seventh impression | 1.2 |

After sequential use of the plates of the proposed set of plates in the infant with cleft lip, jaw and palate, the premaxilla 12 and vomer 13 will run along the impression center plane 19 nearly midway between the maxillary segments 14, 15. The spherical formations of the premaxilla 12 are then usually arranged on both sides of the impression center plane 19 at approximately equal spacings from the lateral jaw segments 14, 15. Uniform growing together of said maxillary elements can be promoted and the occurrence of clefting can be reduced by restoring a uniform arrangement of the maxillary elements.

FIGS. 2A and 3A depict an embodiment of a first plate 1 for insertion into the palate of an infant with cleft lip, jaw and palate for straightening the premaxilla 12 and vomer 13 of the infant and for reducing misalignment of the premaxilla 12 and vomer 13 of the infant of the proposed set of plates. FIG. 2A shows the first plate 1 in a perspective front view. In contrast, FIG. 3A depicts the first plate 1 in a perspective rear view. The plate 1 has two webs 3 running next to each other on both sides and along an imaginary center plane 9 perpendicular to the plate 1 and on the upper side of the plate. A free space 6 for receiving the vomer 13 and for straightening the vomer 13 is formed between the webs 3. The webs 3 run from a first end of the plate 1 parallel and in a straight line to the center plane 9 at a uniform spacing of, for example, 0.8 cm from one another. However, the spacing can also be, for example, at least 0.3 cm and, for example, at most 1.5 cm. In addition, the spacing can also be uneven and change, for example, along the central axis, in particular gradually, in a range from 0.3 cm to 1.5 cm. A length of the webs 3 along the center plane 9 is typically greater than half the length of the plate 1 along the central axis 9, the length of the plate 1 being 5 cm, for example. A width of the plate 1 transverse to the central axis 9 is 4.5 cm, for example. The center plane 9 of the plate 1 corresponds to the sagittal plane of the palate when the plate 1 is inserted into the palate.

Table 3 gives the dimensions of the webs 3 and the plates of the proposed set of plates for sequential use. Seven plates are listed as an example. The specified values are rounded to the decimal place. Depending on the anatomical condition of the palate of the infant, the height of the webs 3 may need to be varied between the different plates of the set of plates. For example, the height of the webs 3 of the first three plates can each increase and remain constant from the fourth plate onwards. An initially lower height of the webs 3 may be necessary, for example, in order to successively displace the nasal concha of the infant until the webs 3 can enclose the vomer of the infant 13. The length of the plates of the set of plates can increase, for example, from the first to the second plate in order to encompass the vomer of the infant 13 over as large an area as possible by the webs 3, thereby making it easier to straighten up the vomer of the infant 13. For example, beginning with the third plate of the set of plates, the length of the individual plates can progressively decrease from plate to plate, since the vomer of the infant 13 tends to straighten as the number of plates increases, and less surface area for the webs 3 to encompass the vomer 13 may be required. Insertion of the plate into the palate of the infant and comfort for the infant can be improved without affecting the function of the plate by progressively reducing the length of the plates from plate to plate of the set of plates.

TABLE 3

Exemplary dimensions of the individual plates and their webs of the proposed set of plates

| Set of plates | Height of the webs in cm | Width of the first web in cm | Width of the second web in cm | Width of the plate in cm | Length of the plate (without holding device) in cm |
|---|---|---|---|---|---|
| First plate | 0.8 | 0.9 | 0.3 | 4.5 | 3.5 |
| Second plate | 1 | 0.8 | 0.5 | 4.6 | 4 |
| Third plate | 1.2 | 0.6 | 0.8 | 4.6 | 3.7 |
| Fourth plate | 1.4 | 0.6 | 0.8 | 4.6 | 3.4 |
| Fifth plate | 1.4 | 0.6 | 0.7 | 4.6 | 3.2 |
| Sixth plate | 1.4 | 0.6 | 0.7 | 4.6 | 3 |
| Seventh plate | 1.4 | 0.6 | 0.7 | 4.6 | 2.8 |

When inserting the plate 1 into the palate, the vomer 13 is received into the free space 6 and caught between the two webs 3. The shape of the plate 1 is adapted to the palate of the infant such that the plate 1 is supported on the palate in particular by the wings 4 and is fixed to the palate in a plurality of directions. Due to the firm fit of the plate 1 on the palate and an offset of the course of the webs 3 to the current course of the vomer 13, a new course can be imposed on the shape of the course of the vomer 13 enclosed in the free space 6 by means of a therapeutic force. The therapeutic force is considered to be the force exerted by the proposed plate 1 on the palate of the infant when the plate 1 is inserted into the palate of the infant.

The webs 3 of the plate 1 are formed in a straight line along the center plane 9 and run alongside one another along the center plane 9. Webs 3 running in a straight line and next to one another are particularly advantageous for exerting a therapeutic force on the vomer 13 until the course of the vomer 13 corresponds to the course of the webs 3 running in a straight line and next to one another along the center plane 9. A curved course of the vomer 13 can be straightened by a therapeutic force, or a curve of the unbent vomer 13 can be prevented by using the plate 1 shown in FIGS. 2A and 3A. A non-curved vomer 13 can decisively reduce the occurrence of consequential damage, in particular obstructions to the breathing of the patient in the nasal region.

Furthermore, the webs 3 each have a first end pointing in the same direction as the first end of the plate 1. A receptacle 2 having a trough-like depression is arranged on a second end of the webs 3 opposite the first end of the webs 3. The trough-like depression has two spherical bulges and is designed such that an inner surface of the trough-like depression can circumferentially surround the premaxilla 12 when the plate 1 is inserted into the palate. A circumferential surrounding of the premaxilla 12 by the trough-like depression enables the premaxilla to be held in a particularly advantageous manner when the plate is inserted into the palate of the infant. A maximum width, determined transversely to the center plane 9, of a receiving region of the plate 1 containing the receptacle 2 is 80 percent of a maximum width of the plate 1, determined transversely to the center plane 9. Due to the shape and arrangement of the receptacle 2 of the plate 1 depicted in FIG. 2A, the premaxilla 12 can be arranged in a straight shape and in equal parts on both sides of the central axis 9 by means of the therapeutic force of the plate 1. In addition, the shape and arrangement of the premaxilla 12 can be maintained by using the plate 1. The plate 1 shown in FIG. 2A can be a last plate in a set of plates for sequential treatment which can be used for a desired final state of the course of the vomer 13 and the shape and arrangement of the premaxilla 12.

Furthermore, the plate 1 has two wings 4 running on both sides of the center plane 9, which are designed such that they bear against the palate at least in some regions. With their upper sides, the wings 4 form a contact surface of the plate 1 with the palate when the plate 1 is inserted into the palate. The wings 4 cause the plate 1 to be insertable in a specific position in the palate of the infant. In addition, the wings 4 support a tight fit of the plate 1 in the palate of the infant when the plate 1 is inserted into the palate.

The webs 3 are raised above the contact surface and protrude perpendicularly, that is, cranially, from the contact surface with a height of, for example, 0.8 cm. The contact surface ensures that the webs 3 do not penetrate too far cranially into the nasal region of the infant, to avoid breathing difficulties for the infant due to the webs 3 when the plate 1 is inserted into the palate.

In addition, the wings 4 are arranged on the sides of the webs 3 facing away from the center plane 9, so that the respective wings 4 reach up to the respective web 3. A maximum length of the wings 4 determined along the center plane 9 is 80 percent of a length determined along the center plane 9. In addition, the maximum length of the wings 4 defines a longitudinal section aligned along the center plane 9, so that a maximum width of the plate 1 determined transversely to the center plane 9 is reduced by 50 percent in the longitudinal section, a length of the longitudinal section determined along the center plane 9 being 15 percent of a maximum length of the plate 1 determined along the center plane 9. The plate thereby forms a T-shaped structure.

Furthermore, the plate has a holding device 5 for clamping a tensioning device for the application of force to the plate along the center plane with two fixing projections. The fixing projections are arranged on both sides of the center plane 9 on an end of the receptacle 2 facing away from the webs 3 and running in a direction along the center plane 9. The fixing projections protrude from the receptacle 2 to the front, that is, in anterior.

When the plate 1 is inserted into the palate of the infant, the fixing projections usually protrude from the mouth of the infant. Rubber bands can be clamped to the protruding fixing projections in order to generate a force on the plate 1 along the center plane 9 in order to displace the premaxilla 12 and the vomer 13 along the center plane 9. Thus, by means of the plate 1, misalignments of the premaxilla 12 and the vomer 13 can also be corrected in the anterior and in the posterior and a curvature of the vomer 13 can be prevented.

FIGS. 2B and 3B depict in front view an embodiment of a second plate 1 for insertion into the palate of an infant with cleft lip, jaw and palate for straightening the vomer 13 of the infant of the proposed set of plates. FIG. 2B shows the second plate 1 in a perspective front view. FIG. 3B shows the second plate 1 in a perspective rear view. The second plate 1 essentially comprises the features of the first plate 1 shown in FIG. 2A and differs in that the second plate 1 has an offset in the course of the webs 3 and the shape and arrangement of the receptacle 2 with respect to the course of the webs 3 and the shape and arrangement of the receptacle 2 of the first plate 1.

The second plate 1 of a set of plates for sequential treatment shown in FIG. 2B may be suitable for an initial or starting state of a maxilla of the infant with cleft lip, jaw and palate. The second plate 1 can cause a first displacement in the course of the vomer 13 in the initial state and the shape and arrangement of the premaxilla 12 in the initial state in which the second plate has a first transverse displacement in the course of the webs 3 and the shape and arrangement of the receptacle 2 with respect to the course of the vomer 13 and the shape and arrangement of the premaxilla 12 in the initial state, and are first inserted into the palate of the infant. After the course of the webs 3 of the second plate 1 has been imposed on the course of the vomer 13 and the shape and arrangement of the receptacle 2 on the shape and arrangement of the premaxilla 12, the second plate 1 can be exchanged for a further plate 1 of the set of plates. The further plate 1 can cause a second displacement of the course of the vomer 13 and the shape and arrangement of the premaxilla 12, in which the further plate 1 has a second transverse offset of the course of the webs 3 and the shape and arrangement of the receptacle 2 with respect to the course of the vomer 13 and the shape and configuration of the premaxilla 12 in the initial state, the second transverse offset being greater than the first transverse offset, and being inserted second into the palate of the infant. The further plate 1 can also be replaced by a new plate 1 having a further transverse offset of the course of the webs 3 and the shape and arrangement of the receptacle 2 with respect to the course of the vomer 13 and the shape and arrangement of the premaxilla 12 in the initial state, the further transverse offset being greater than the second transverse offset. The direction of the transverse offsets is represented by a directional arrow 8. Such a successive exchange of the plates of the set of plates can take place until the course of the vomer 13 and the shape and arrangement of the premaxilla 12 are displaced so far that the last plate 1 from FIG. 2A can be inserted and the last treatment step for straightening the vomer 13 and the premaxilla 12 can be completed.

FIG. 2C shows in front view a perspective representation of the first plate 1 from FIG. 2A with a superimposition of the course of the webs 3 and the shape and arrangement of the receptacle 2 of the second plate 1 from FIG. 2B of the proposed set of plates represented by a dashed contour. The superimposition makes it clear that the second plate 1 has transverse offsets in the course of the second ends of the webs 3 and the receptacle 2 with respect to the courses of the second ends of the webs 3 and the receptacle 2 of the first plate 1. Analogous to the transverse offsets, however, longitudinal offsets of the courses of the second ends of the webs 3 and the receptacle 2 of the second plate 1 are also possible, transverse offsets with respect to the courses of the second ends of the webs 3 and the receptacle 2 of the first plate 1.

Typically, the transverse offsets are determined by means of misalignments of the premaxilla 12, the vomer 13 and the lateral jaw segments 14, 15 calculated from the impression 10 of the maxilla of the infant with cleft lip, jaw and palate. The transverse offsets are designed such that upon insertion of the second plate 1 into the palate of the infant, a therapeutic force is exerted by the second plate 1 on the premaxilla 12 and vomer 13 of the infant. This is typically achieved in that the courses of the webs 3 of the second plate 1 have a smaller transverse offset than a transverse offset given by a misalignment of the premaxilla 12 and the vomer 13. Advantageously, the therapeutic force should be applied in a direction opposite to that indicated by the directional arrow 8 so that the misalignments of the premaxilla 12 and the vomer 13 can be reduced by the inserted second plate 1. By inserting the second plate 1 into the palate of the infant with a cleft lip and jaw, a force can be applied to the premaxilla 12 and the vomer 13 until they are displaced such that they are arranged in the shape predetermined by the webs 3 and the receptacle of the second plate 1. The second plate 1 inserted into the palate can now be exchanged for the first plate 1 in order to provide renewed force acting on the displaced premaxilla 12 and the displaced vomer 13. The premaxilla 12 and the vomer 13 are displaced again by the first plate 1 inserted into the palate until they have assumed the shape specified by the first plate 1. The premaxilla 12 and the vomer 13 are then positioned in a position midway between the maxillary segments 14, 15 in a straight line along the center plane 9. With such a sequential treatment by the set of plates, the misalignments of the premaxilla 12 and the vomer 13 can thus be corrected and the curvature of the vomer 13 can be avoided.

Depending on the severity of the misalignment, further plates 1 from the set of plates can be provided which are successively inserted into the palate of the infant and sequentially reduce the misalignment of the premaxilla 12 and the vomer 13. When producing further plates, it must be taken into account that the volume of the maxilla elements increases over time and that the further plates have to be adapted to the new volumes.

FIGS. 4A-D schematically depict different arrangements of the receptacle 2 and the webs 3 with respect to the center plane 9 of a plate from a set of plates.

Figure 4A:
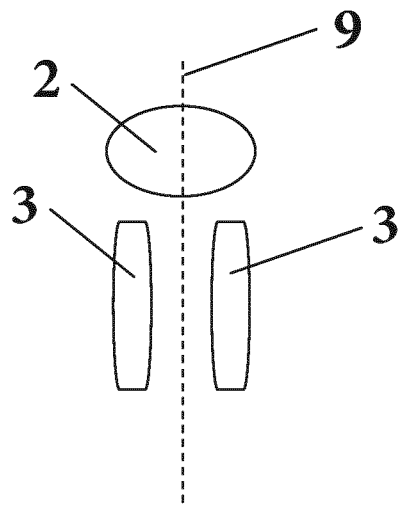

The arrangement of the receptacle 2 and the webs 3 shown in FIG. 4A corresponds to an arrangement of the receptacle 2 and the webs 3 of the first plate 1 from FIG. 2A. The webs 3 are arranged in a straight line along the center plane 9 and the receptacle 2 is arranged in equal parts on both sides of the center plane 9.

Figure 4B:
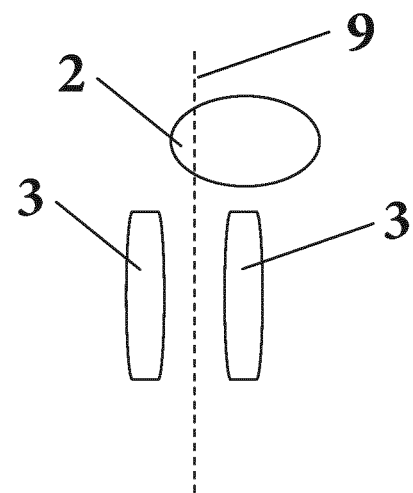
Figure 4C:
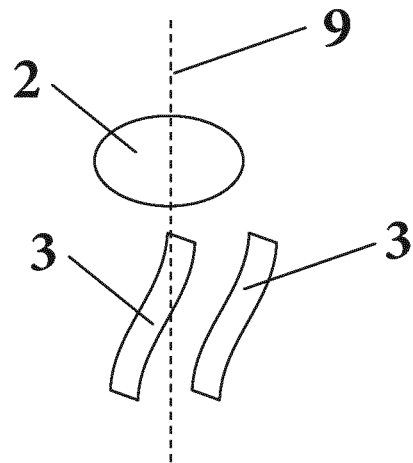

However, it can also be provided, as shown in FIGS. 4B and 4C, that either the receptacle 2 has a transverse offset transverse to the center plane 9, for example, with respect to the arrangement of the receptacle 2 shown in FIG. 4A, or the course of the webs has a transverse offset transverse to the center plane 9, for example, with respect to the arrangement of the webs 3 shown in FIG. 4A. In this way, the course of the vomer 13 can be maintained and the shape and arrangement of the premaxilla 12 can be changed, or the course of the vomer 13 can be changed and the shape and arrangement of the premaxilla 12 can be retained. Depending on the shape and arrangement of the receptacle 2 and the course of the webs 3, various misalignments of the vomer 13 and the premaxilla 12 can be treated independently and in a targeted manner by means of the set of plates.

Figure 4D:
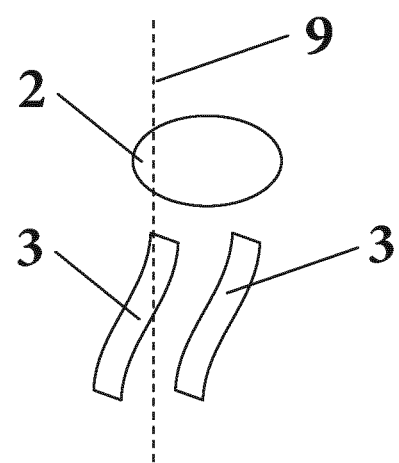

The arrangement of the receptacle 2 and the webs 3 shown in FIG. 4D corresponds to an arrangement of the receptacle 2 and the webs 3 of the second plate 1 from FIG. 2B. The arrangement of the receptacle 2 and the course of the webs 3 have a transverse offset transverse to the center plane 9, for example, with respect to the arrangement of the receptacle 2 and the webs 3 shown in FIG. 4A. The course of the vomer 13 and the arrangement of the premaxilla 12 can be changed simultaneously in this way.

Figure 5A:
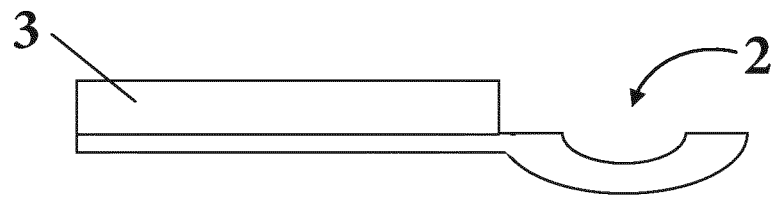
Figure 5B:
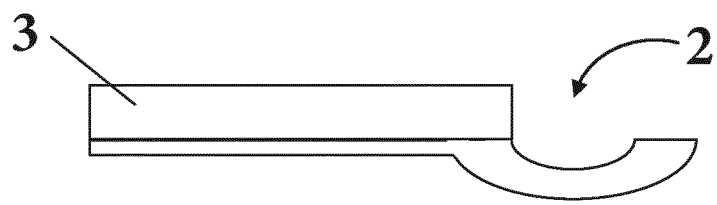

FIGS. 5A-D show cross-sections along the center plane 9 of different plates of a set of plates. The plates each have a transition from the web 3 to the receptacle 2. FIG. 5A shows a rectangular web 3, a spacing with a straight plateau remaining between the trough-like depression of the receptacle 2 and the web 3. The plate shown in FIG. 5B also has a rectangular web 3, there being a direct transition between the web 3 and the trough-like depression of the receptacle 2.

Figure 5C:
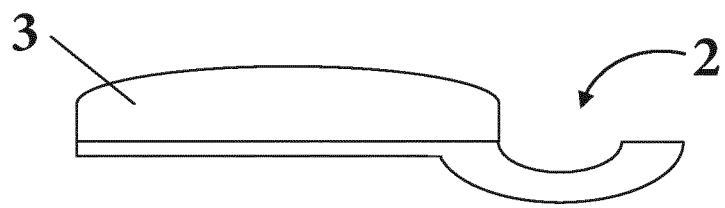
Figure 5D:
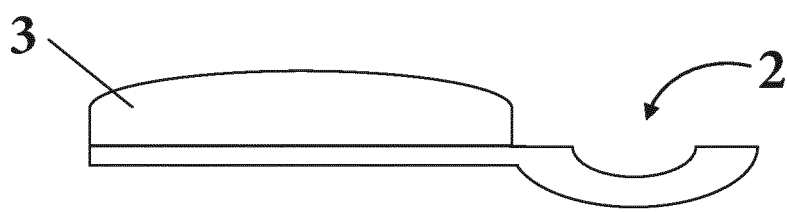

FIG. 5C, on the other hand, shows a rounded web 3 with a spacing between the trough-like depression of the receptacle 2 and the web 3, also with a straight plateau. The plate shown in FIG. 5D also has a rounded web 3, there being a direct transition between the web 3 and the trough-like depression of the receptacle 2. Depending on the anatomical condition of the palate of the infant, such as the nasal concha, the end of the web 3 and/or the transition between the web 3 and the trough-like depression of the receptacle 2 can be adapted to the anatomical condition of the palate of the infant. Said adjustment and the rounded webs 3 can help to reduce pain for the infant when the plate is inserted into the palate of the infant.

The invention claimed is:

1. A plate for insertion into a palate of a patient, the plate comprising:
a first wing and a second wing on opposing sides of an imaginary center plane running perpendicular to and bisecting the plate, wherein the first wing and the second wing are configured such that they bear against the palate at least in regions, and wherein a first web and a second web are located on either side of the imaginary center plane, so that a free space located between the webs is formed for receiving a vomer.

2. The plate according to claim 1, further comprising:
a receptacle for receiving a premaxilla, wherein the receptacle includes at least one depression.

3. The plate according to claim 2, wherein the receptacle is arranged on an end of one of the first web or the second web arranged in a direction along the imaginary center plane, and wherein the depression is configured such that an inner surface of the depression circumferentially surrounds the premaxilla when the plate is inserted into the palate.

4. The plate according to claim 2, wherein a maximum width, determined transversely to the imaginary center plane, of a receiving region of the plate containing the receptacle is at most 80 percent, of a maximum width of the plate determined transversely to the imaginary center plane.

5. The plate according to claim 2, further comprising:
a holding device; and
a tensioning device for applying force on the plate along the imaginary center plane, wherein the holding device is configured for clamping the tensioning device, wherein the holding device is arranged on an end of the receptacle facing away from the first web and the second web and is arranged in a direction along the imaginary center plane.

6. The plate according to claim 1, wherein the first wing and the second wing contact the plate at a contact surface of the plate and wherein the first web and the second web project on one side of the plate such that they are raised above the contact surface.

7. The plate according to claim 6, wherein a height of at least one of the first web or the second web, determined perpendicularly to the contact surface and starting from the contact surface, is at least 0.4 cm and at most 2 cm.

8. The plate according to claim 7, wherein the height of the at least one of the first web or the second web is at most 1.5 cm.

9. The plate according to claim 1, wherein the first web and the second web are spaced apart from one another transverse to the imaginary center plane at least 0.3 cm and at most 2 cm.

10. The plate according to claim 1, wherein the first wing is arranged on a side of the first web and the second wing is arranged on a side of the second web facing away from the imaginary center plane.

11. The plate according to claim 10, wherein a maximum length of the first wing and the second wing determined along the imaginary center plane is at most 100 percent of a length of at least one of the first web or the second web determined along the imaginary center plane.

12. The plate according to claim 11, wherein the maximum length of the first wing and the second wing defines a longitudinal section aligned along the imaginary center plane, wherein a maximum width of the plate determined transversely to the imaginary center plane is reduced in the longitudinal section by at least 40 percent, and wherein a length of the longitudinal section determined along the imaginary center plane is at most 25 percent of a maximum length of the plate determined along the imaginary center plane.

13. A set of plates for sequentially straightening a vomer of an infant with cleft lip, jaw and palate, comprising:
at least one first plate; and
a second plate, wherein the at least one first plate and the second plate include:
a first wing and a second wing on opposing sides of an imaginary center plane arranged perpendicular to and bisecting the plate wherein the first wing and the second wing are configured such that they bear against the palate at least in regions, and wherein a first web and a second web are located on either side of the imaginary center plane, so that a free space located between the webs is formed for receiving the vomer; and
wherein a first spatial course of the first web and the second web of the at least one first plate in a direction along the imaginary center plane of the at least one first plate differs from a second spatial course of the first web and the second web of the second plate in a direction along the imaginary center plane of the second plate.

14. The set of plates according to claim 13, wherein the first web and the second web include a first end arranged in a direction along the imaginary center plane and a second end opposite the first end, and wherein the first end of the first web of the at least one first plate is arranged offset by a first transverse offset with respect to the second end of the first web of the at least one first plate transversely to the imaginary center plane of the at least one first plate, wherein the first end of the second web of the at least one first plate is arranged offset by a second transverse offset with respect to the second end of the second web of the at least one first plate transversely to the imaginary center plane of the at least one first plate, wherein the first end of the first web of the second plate is arranged offset by a third transverse offset with respect to the second end of the first web of the second plate transversely to the imaginary center plane of the second plate, and wherein the first end of the second web of the second plate is arranged offset by a fourth transverse offset with respect to the second end of the second web of the second plate transversely to the imaginary center plane of the second plate, and wherein the second transverse offset is at least 15 percent.

15. The set of plates according to claim 14, wherein at least one of the first transverse offset is at least 30 percent smaller than the third transverse offset, the second transverse offset is at least 20 percent smaller than the fourth transverse offset, or the first end of the first web of the at least one first plate is arranged offset by a first longitudinal offset along a direction parallel to the imaginary center plane of the at least one first plate with respect to the second end of the first web of the at least one first plate.

16. The set of plates according to claim 15, wherein the first end of the second web of the at least one first plate is arranged offset by a second longitudinal offset along a direction parallel to the imaginary center plane of the first plate with respect to the second end of the second web of the first plate, wherein the first end of the first web of the second plate is arranged offset by a third longitudinal offset along a direction parallel to the imaginary center plane of the second plate with respect to the second end of the first web of the second plate, and wherein the first end of the second web of the second plate is arranged offset by a fourth longitudinal offset along a direction parallel to the imaginary center plane of the second plate with respect to the second end of the second web of the second plate.

17. The set of plates according to claim 16, wherein the first longitudinal offset is at least 15 percent smaller than the third longitudinal offset.

18. The set of plates according to claim 16, wherein the second longitudinal offset is at least 15 percent smaller than the fourth longitudinal offset.

19. A method for producing at least one plate for insertion into a palate of an infant with a cleft lip, jaw and palate for straightening a vomer of the infant, comprising:
  making and measuring an impression of a maxilla of the infant for determining a spatial arrangement of the vomer, a premaxilla and two lateral maxillary segments of the infant relative to one another;
  determining at least one of a vomer transverse misalignment of an end of the vomer directed towards the premaxilla, determined transversely to a sagittal plane of the infant, or determining a vomer longitudinal misalignment of the end of the vomer directed toward the premaxilla, determined along the sagittal plane of the infant; and
  producing at least one plate, the at least one plate including:
    a first wing and a second wing on opposing sides of an imaginary center plane arranged perpendicular to and bisecting the at least one plate wherein the first wing and the second wing are configured such that they bear against the palate at least in regions, and wherein a first web and a second web are located on either side of the imaginary center plane, so that a free space located between the webs is formed for receiving the vomer, wherein the first web and the second web each include a first end arranged in one direction along the imaginary center plane and a second end opposite the first end wherein at least one of:
      (i) the first end of the first web is arranged offset by a first transverse offset determined transversely to the imaginary center plane of the at least one plate with respect to the second end of the first web and that the first end of the second web is arranged offset by a second transverse offset determined transversely to the imaginary center plane of the at least one plate with respect to the second end of the second web, wherein the first transverse offset and the second transverse offset are each selected depending on the previously determined vomer transverse misalignment; or
      (ii) the first end of the first web being arranged offset by a first longitudinal offset determined along a direction parallel to the imaginary center plane of the at least one plate with respect to the second end of the first web, wherein the first end of the second web is arranged offset by a second longitudinal offset determined along a direction parallel to the imaginary center plane of the at least one plate with respect to the second end of the second web, and wherein the first longitudinal offset and the second longitudinal offset are each selected depending on the previously determined vomer longitudinal misalignment.

20. The method of claim 19, wherein the at least one plate comprises a first plate and a second plate and wherein at least one of:
  the first transverse offset of the first end of the first web of the first plate is selected to be smaller than the first transverse offset of the first end of the first web of the second plate and wherein the second transverse offset of the first end of the second web of the first plate is selected to be smaller than the second transverse offset of the first end of the second web of the second plate; or
  the first longitudinal offset of the first end of the first web of the first plate is selected to be smaller than the first longitudinal offset of the first end of the first web of the second plate and wherein the second longitudinal offset of the first end of the second web of the first plate is selected to be smaller than the second longitudinal offset of the first end of the second web of the second plate.

* * * * *